United States Patent [19]

Norman

[11] 4,157,169

[45] Jun. 5, 1979

[54] FLUID OPERATED GATE VALVE FOR USE WITH VACUUM EQUIPMENT

[75] Inventor: Arthur E. Norman, Northridge, Calif.

[73] Assignee: Torr Vacuum Products, Van Nuys, Calif.

[21] Appl. No.: 841,570

[22] Filed: Oct. 12, 1977

[51] Int. Cl.[2] .................... F16K 3/03; F16K 31/143

[52] U.S. Cl. .................... 251/195; 251/63.6; 251/62; 251/167; 251/187

[58] Field of Search .................... 251/62, 63.5, 63.6, 251/175, 167, 187, 195; 137/327

[56] References Cited

U.S. PATENT DOCUMENTS

| | | | |
|---|---|---|---|
| 2,705,610 | 4/1955 | Hjulian | 251/175 |
| 2,825,528 | 3/1958 | Truitt | 251/175 |
| 4,054,156 | 10/1977 | Benson | 251/63.6 |

FOREIGN PATENT DOCUMENTS

| | | | |
|---|---|---|---|
| 2257096 | 7/1973 | Fed. Rep. of Germany | 251/63.5 |

*Primary Examiner*—Martin P. Schwadron
*Assistant Examiner*—A. Michael Chambers
*Attorney, Agent, or Firm*—Keith D. Beecher

[57] ABSTRACT

A gate valve for use with vacuum equipment is provided in which a gate assembly is opened and closed by a fluid operated device, such as a pneumatic cylinder. The gate assembly is enclosed in a valve housing. The valve housing has aligned openings therein, and the gate assembly is moved reciprocally between the walls and parallel to the planes of the aligned openings therein, to an open position and to a closed position with respect to the openings. The gate assembly comprises two gates which are intercoupled by a bellows, the bellows defining a hermetically sealed pressure vessel with the gates. The gate assembly is coupled to a piston in the pneumatic cylinder by a piston rod. The gate assembly is moved to its closed position when pressurized fluid is introduced to one end of the pneumatic cylinder; and the gate assembly is moved to its open position when pressurized fluid is introduced to the other end of the cylinder. When the gate assembly is moved to its closed position, a valve opens within the pneumatic cylinder, and pressurized fluid from the pneumatic cylinder is caused to enter the pressure vessel between the gates. This pressurized fluid forces the gates against seats mounted on the valve housing around the respective openings therein. Metal seals are provided for the gates, in the form of layers of relatively soft metal around the gates. The valve housing itself may be evacuated to reduce pressure differential across the gate-seat junctions and minimize molecular leakage. Relief grooves are provided adjacent the edges of the gates so that the outer perimeters of the gates are relieved to be deflected when the gates are closed so as to provide a resilient stress on the gate seals. This resilient stress serves to maintain the gates in a sealed condition even in the presence of temperature changes and resulting thermal expansion and contraction.

9 Claims, 5 Drawing Figures

10
12
16
18
20
22
24
26
40
42
44
48
50
52
56
62
64
66
68
70
72
74
76
78
80
82
84
86
2

60
50
58
24
18
10
14
22
44
12
34
36
46
38
40
42
30
32
20
48
1

60
56
96
50
94
58
76
24
22
24
16
18
84
54
56

44
56
44
5
86
44
62
66
44
44
66
68
62
44
44
40
44
20
48
5

4
4
34
34
36
36
46
46
46
46
44
42
42
38
30
32
90
91

FLUID OPERATED GATE VALVE FOR USE WITH VACUUM EQUIPMENT

BACKGROUND OF THE INVENTION

Valves for use with vacuum equipment are essentially different from valves used in conventional systems whose objective is to control the flow of a liquid or gas. In such conventional systems, some leakage of the liquid or gas can usually be tolerated. In the case of vacuum valves however, even the slightest leak involves not merely the loss of a liquid or gas, but total destruction of the vacuum in the vacuum equipment controlled thereby.

In addition, vacuum destroying gases originate not only through leaks in the valves, but also from the materials used in the construction of conventional valves. For that reason, it is most desirable to use all-metal valves in conjunction with vacuum equipment. Specifically, it is not feasible to use organic materials for the seals of valves to be used in conjunction with high vacuum systems.

All-metal valves have been produced in the prior art for use with vacuum equipment, and such valves usually comprise a metal gate which is moved at right-angles to the orifice to be closed thereby, between an open position and a closed position. Such valves usually include appropriate means for causing the gate to be sealed against a seat surrounding the orifice, when the gate is in its closed position.

The present invention provides an improved construction for such a valve in which mechanical linkages and mechanisms required to actuate the gate are minimized, and in which the valve gate is activated and forced against the seat around the orifice by means of a simple fluid actuated mechanism which requires a minimum of moving parts.

The valve of the invention is mounted in a hermetically sealed valve housing which is evacuated so as to reduce the pressure differential across the gate-seat seal to a minimum so as to obviate any tendency for molecular leaks to occur across the seal.

All-metal seals are used in the valve of the invention, so that the assembly may be entirely formed of metal, and so that the assembly may be free from organic materials which could destroy the vacuum within the equipment with which the valve is used. Moreover, the valve of the invention may be operated in wide extremes of ambient temperatures without destroying the seals between its gates and their seats. Moreover, the valve of the invention can be placed in areas where high levels of radiation occur which would otherwise damage organic seals, and the like, and cause them to give off gases or vapors.

The sealing edges of the gates in the valve of the invention are relieved, so that when the gates are closed and forced against the corresponding orificies by internal fluid pressure, the outer edges of the gates are deflected, and the resulting resilient stress of the gates against the seats causes the gates to be held firmly against the seats even in the presence of thermal expansion or contraction.

The gates and seats of the valve in the embodiment to be described are formed of relatively hard metal such as stainless steel, and a layer of relatively soft metal, such as copper or gold, is deposited around the peripheral edge of each seat, or on the adjacent portion of each gate, so as to constitute a seal.

DETAILED DESCRIPTION OF THE ILLUSTRATED EMBODIMENT

Figure 1:
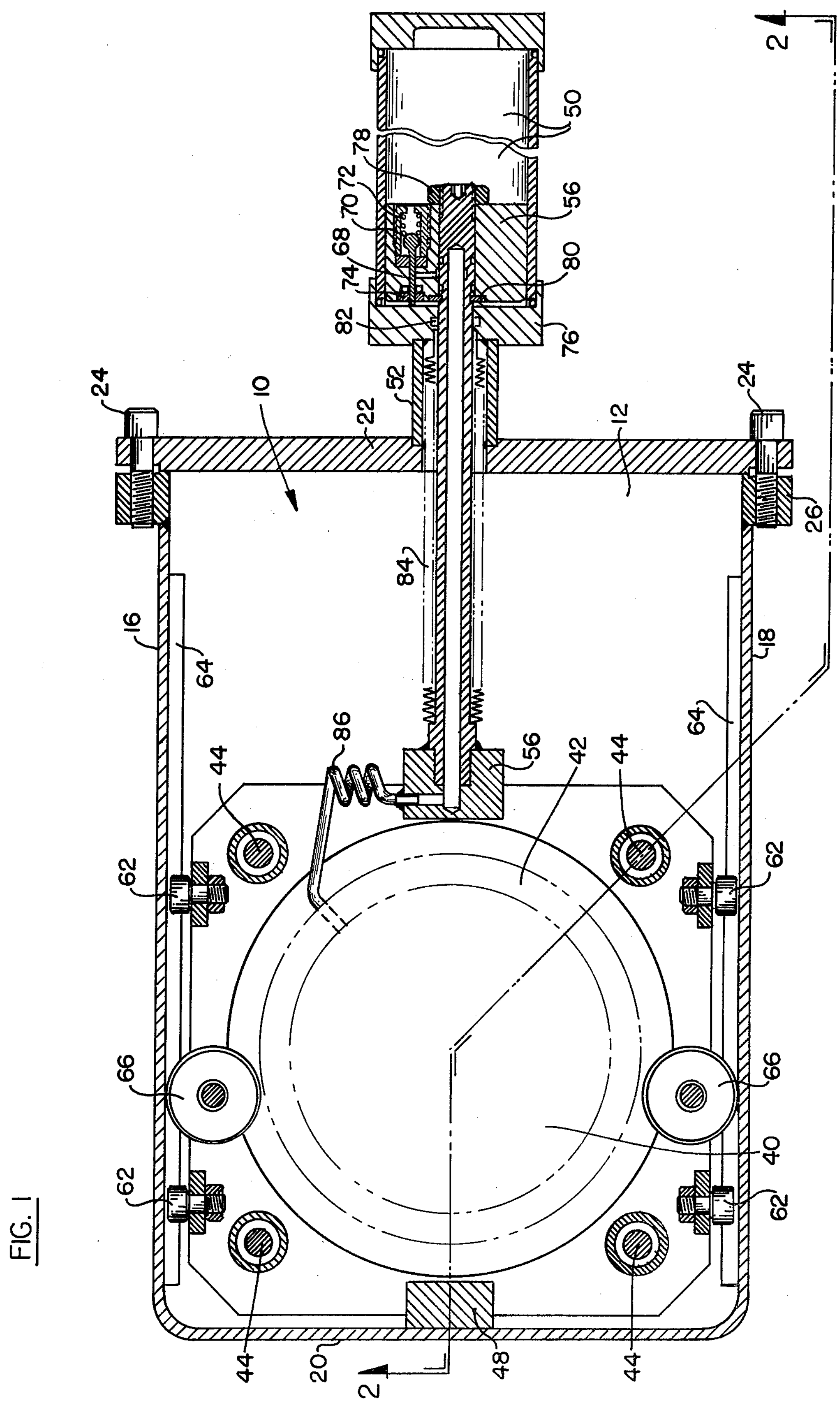
FIG. 1 is a sectional view of a gate valve assembly constructed in accordance with one embodiment of the invention, and taken essentially along the line 1—1 or FIG. 2.
Figure 2:
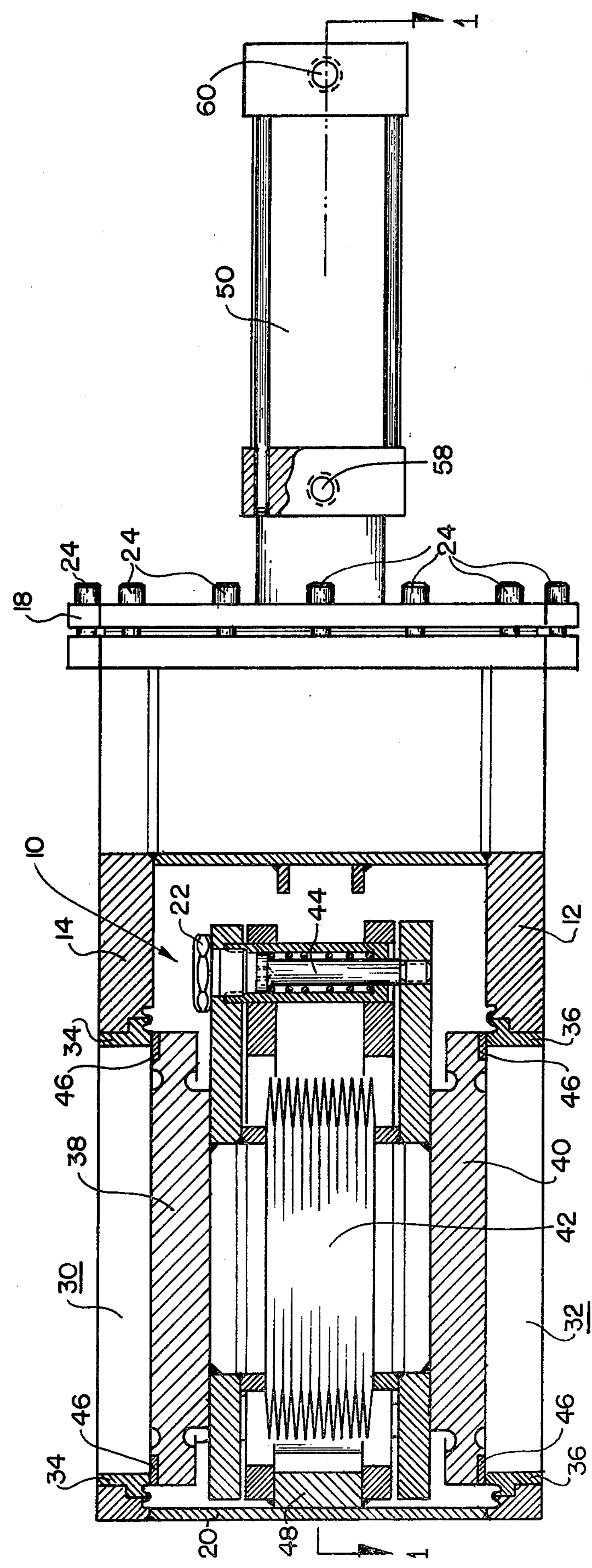
FIG. 2 is a sectional view of the valve assembly of FIG. 1 taken essentially along the line 2—2 of FIG. 1.

The embodiment of the invention shown in FIGS. 1 and 2 comprises a gate valve which includes a valve housing 10 which may have a rectangular configuration, and which includes a pair of spaced side walls 12 and 14, and a second pair of side walls 16 and 18. The valve housing also includes an end wall 20, and a second end wall 22. End wall 22 is removably secured to the housing by a plurality of bolts 24 which extend into a flange 26. A soft metal gasket is compressed between end wall 22 and flange 26. Flange 26 is welded or otherwise secured to the walls of the housing 10. The removable end wall 22 provides a simple access to the interior of the valve, and simplifies the dismantling of the valve for repair or replacement purposes.

The side walls 12 and 14 have respective orifices 30 and 32 therein, which are aligned with one another. A corresponding pair of annular members 34 and 36 are fitted into the respective orifices to constitute valve seats. The valve seats may be formed, for example, of 400 Series stainless steel, whereas the valve housing may be formed for example, of 300 Series stainless steel.

A pair of gates 38 and 40 are positioned within the valve housing 10, and these gates are joined by a bellows 42 which forms with the gates a hermetically sealed pressure vessel. A plurality of spring-loaded pins 44 extend between gates 38 and 40, and these pins have a tendency to bias the gates away from the seats 34 and 36. However, when pressurized fluid is introduced into the interior of the pressure vessel, the gates are forced outwardly against the seats, and against the pressure of the spring-loaded pins.

The gates 38 and 40 may also be formed of 300 Series stainless steel. A layer 46 of relatively soft material, such as gold, silver or copper, is deposited around the outer peripheral edge of each of the gates 38 and 40, or on the adjacent surface of the seats 34 and 36, to constitute a seal.

A mechanical stop 48 is mounted to the end of the pressure vessel formed by the gates 38 and 40 and bellow 42, and this mechanical stop engages the end wall 20 of the valve housing when the gates are precisely positioned across the orifices 30 and 32.

A pneumatic cylinder 50 is mounted on the end 22 of the valve housing by means, for example, of a bushing 52 which is welded to the end of the pneumatic cyclinder and to the end wall 22. An actuator rod 54 extends from an internal piston 56 within the pneumatic actuator 50 into the valve housing 10, and the distal end of the actuator rod is secured to the pressure vessel by an appropriate yoke 56.

When pressurized fluid is introduced into a port 58 in the pneumatic cylinder 50, piston 56 is forced to the right-hand end in FIG. 1 to move the gates 38 and 40 parallel to the side walls 12 and 14 of the valve housing to a position in which they are displaced from orifices 30 and 32 so that the valve is open. When pressurized fluid is introduced into a port 60 at the other end of the pneumatic cylinder 50, the piston 56 is forced to the end of the cylinder illustrated in FIG. 1 to cause the gates to move to the positions of FIGS. 1 and 2 adjacent to the orifices 30 and 32, so that the valve is closed. The gates are moved back and forth within the valve housing on rollers 62 which engage tracks 64, and on additional rollers 66 which engage the respective side walls 16 and 18.

As shown in FIG. 1, a normally-closed valve 68 is mounted in piston 56, within a valve housing 70, the valve being spring-loaded to the left in FIG. 1 by an internal spring 72. However, when the piston 56 is moved to the position shown in FIG. 1, an elongated portion of valve 68 which extends through a bushing 74, engages the end wall 76 of the pneumatic cylinder. This causes the valve 68 to move against the force of spring 72 to an open position in which the pressurized fluid in the interior of the pneumatic cylinder is forced into the hollow interior of the actuator rod 54.

The piston 56 is secured to one end of the actuator rod 54 by a nut 78, and is held on the actuator rod by a split washer 80. The end 76 of pneumatic cylinder 50 is sealed to the actuator rod by an appropriate seal 82. Also, the actuator rod is hermetically sealed by a bellows 84 which extends the length of the rod. The left-hand end of the actuator rod 54 is coupled to the interior of the pressure vessel formed by bellows 42 and gates 38 and 40 by a tube 86.

In operation, pressurized fluid is introduced into the pneumatic cylinder 50 through port 60, and this fluid causes the piston 56 to move to the left in FIG. 1 causing the gate assembly to move to a closed position adjacent to the orifices 30 and 32. When piston 56 reaches the end of its travel to the left in FIG. 1, valve 68 opens, and causes the pressurized fluid in the pneumatic cylinder 50 to pass through the actuator rod 54 and through tube 86 to the interior of the pressure vessel formed by the gate assembly, and the pressurized fluid within the pressure vessel forces the gates 38 and 40 against the seats 34 and 36.

The edges of the gates are relieved, as shown by the illustrated grooves, so that when the gates are forced to their closed position, they are deflected in order to form a tight resilient seal with the seats which seal is not affected by thermal expansions or contractions due to changes in ambient temperatures. The soft metal seals 46 serve as a positive and complete seal between the gates and the seats.

The valve housing 10 is evacuated to reduce the pressure differential across the seals 46 to a minimum, so as to avoid molecular leaks. The valve construction, as described above, is all metal, and there are no deleterious effects on the vacuum equipment by the valve components.

To open the valve, the pressure introduced through port 60 is relieved, and pressurized fluid is introduced through port 58. When the pressurized fluid is first relieved from port 60, the spring-loaded pins 44 draw the gates 38 and 40 together, and expel the pressurized fluid in the pressurized valve chamber back through the tube 86 and through the interior of the actuator rod 54 into the interior of the pneumatic cylinder 50. Then, pressurized fluid is introduced into the port 58, to move the piston 56 to the right of the pneumatic cylinder in FIG. 1, and to move the gate assembly to a displaced position away from the orifices 30 and 32 thereby to open the valve.

Figure 3:
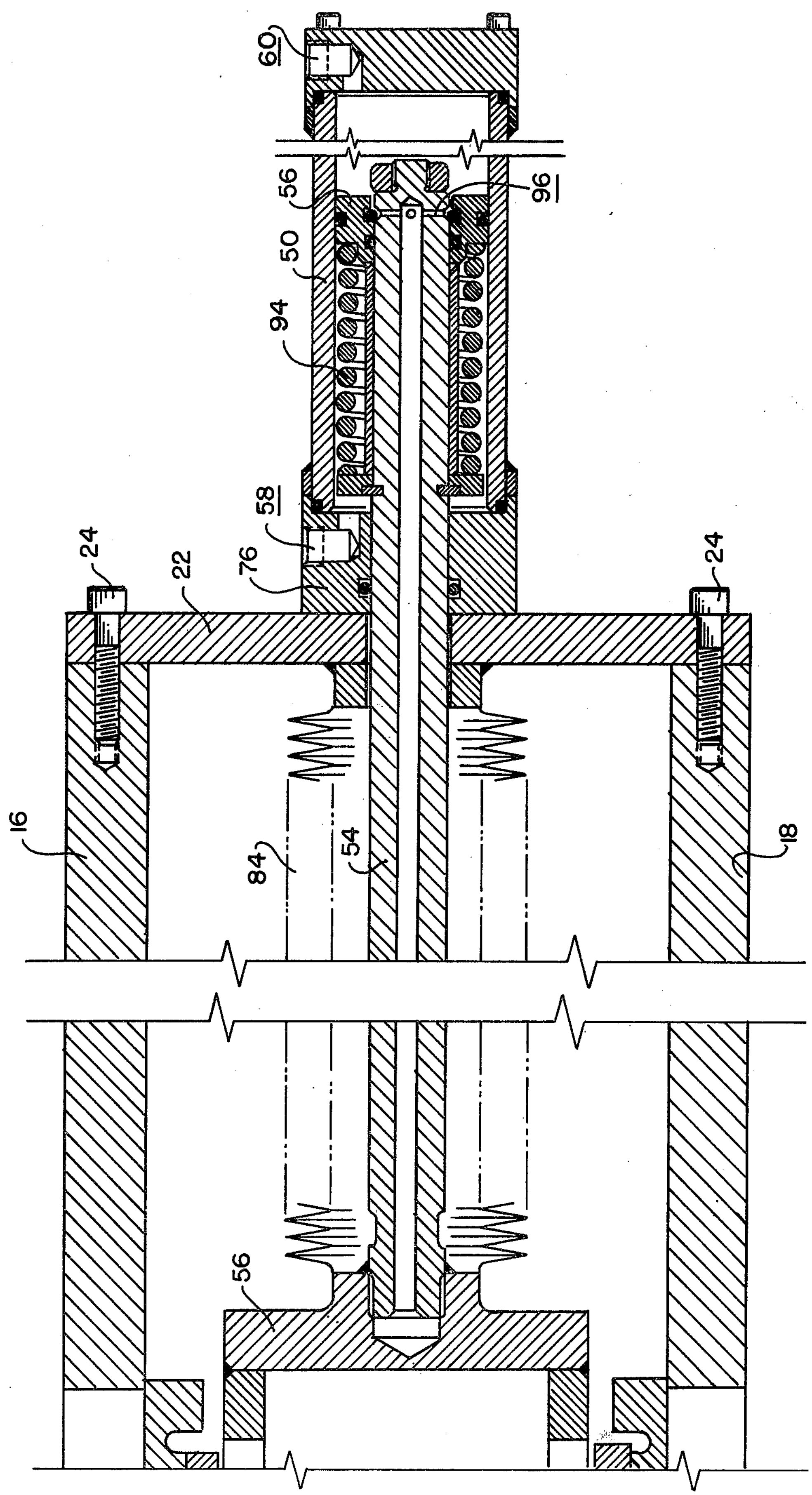
FIG. 3 is a sectional view of a second embodiment of the invention.
Figure 4:
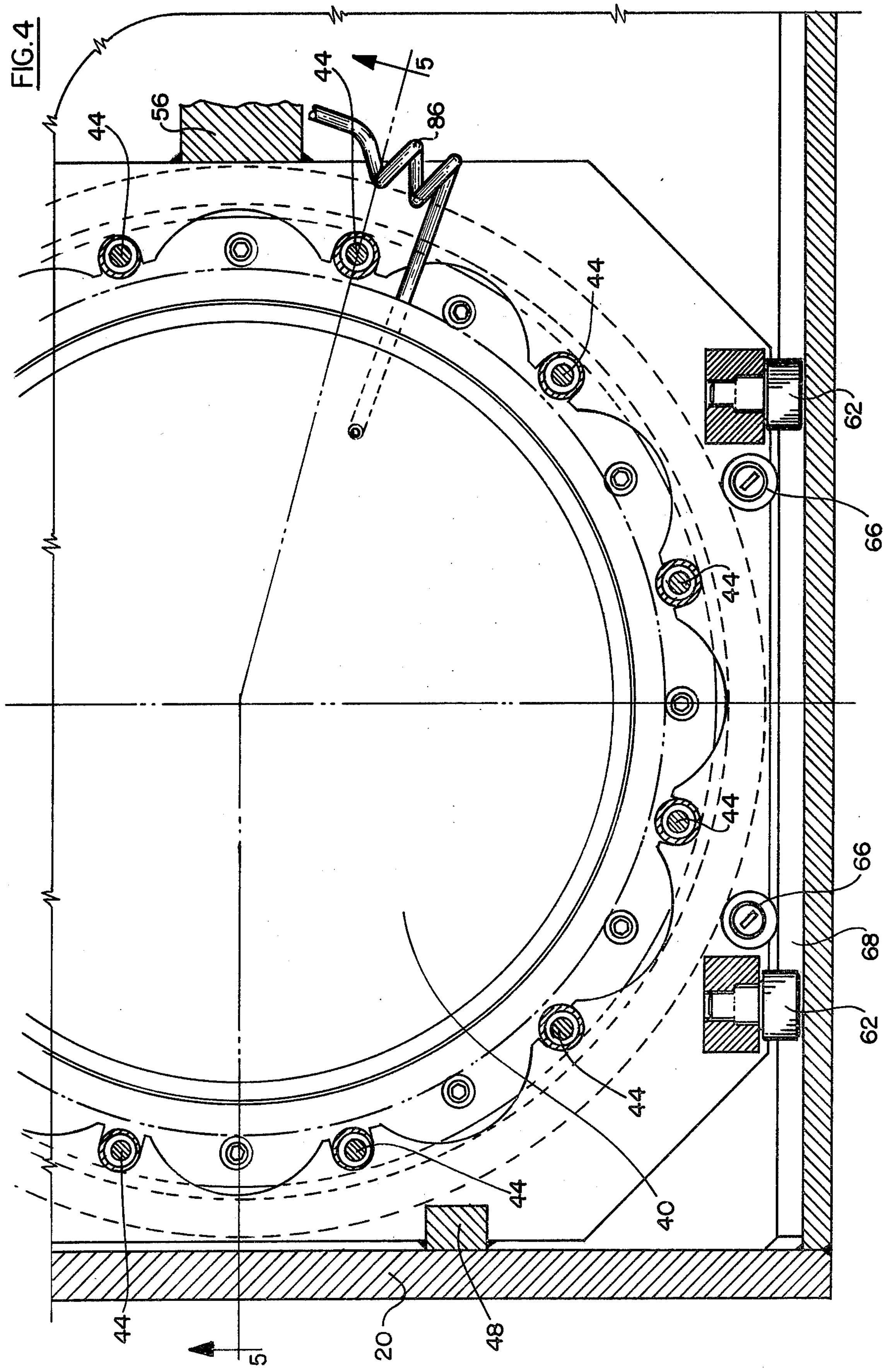
FIG. 4 is a sectional view of the second embodiment taken essentially along the line 4—4 of FIG. 5.
Figure 5:
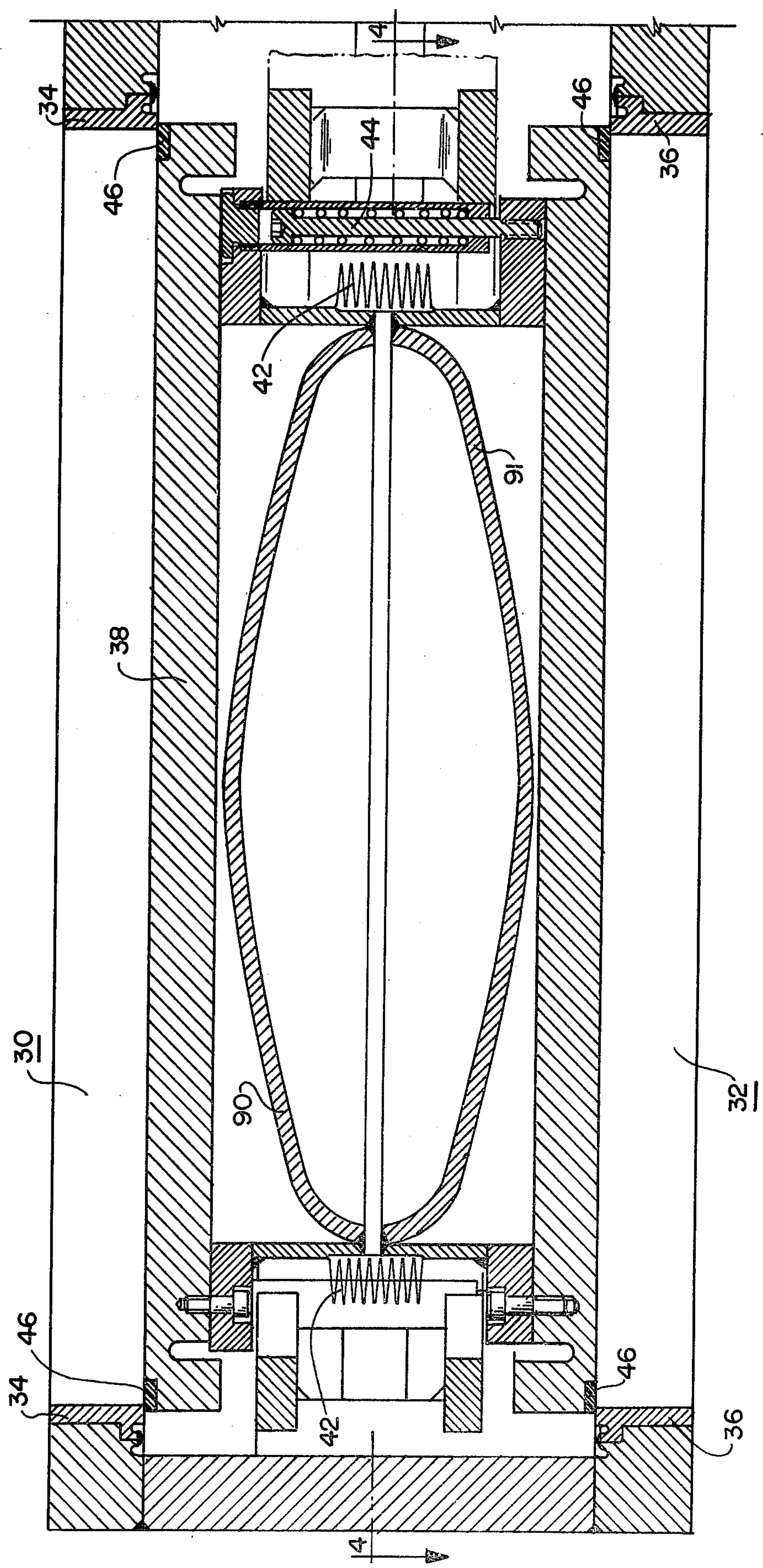
FIG. 5 is a sectional view of the second embodiment taken essentially along the line 5—5 of FIG. 4.

The embodiment of the invention shown in FIGS. 3, 4 and 5 is generally similar to the embodiment of FIGS. 1 and 2, and like components have been designated by the same numerals. In the latter embodiment, the pressure vessel of the gate assembly is formed by bellows 42 in conjunction with a pair of spherical dished head members 90 and 91, the pressurized fluid being introduced into the sealed chamber formed by the heads 90 and 91 and bellows 42 through the tube 86.

A coiled spring 94 is provided within the pneumatic cylinder 50, and when piston head 56 is forced to the left of the cylinder in FIG. 3, it uncovers a port 96 which permits the pressurized fluid to enter the interior of the actuator rod 54, and to enter the pressure vessel through the tube 86. Spring 94, for example, may exert a normal force of 3200 pounds, and a force of 3500 pounds, when compressed. The air pressure introduced into the pneumatic cylinder may have a pressure, for example, of 250 psi.

In the two embodiments of the invention described above, the main seals of the valve are positioned at the interface between the gates and the seats. The seats are removable from the housing by cutting the weld attaching the seats thereto. This allows freedom from the effects of deflection of the housing section, and it permits a wider choice of materials for the seat surfaces. It also allows the seats to be machine lapped to achieve the required flatness and surface smoothness.

The gates themselves are attached to the pressure vessel housings, and each of the housings are fabricated to be enclosed either by the gates themselves, as in the first embodiment, or by separate spherical dished heads, as in the second embodiment. The pressure vessels are hermetically sealed by the bellows to form, for example, a 250 psi. When the vessel is pressurized with pressurized fluid from the pneumatic cylinder 50, the gates are moved approximately 0.1 inches outwardly against the seats to effectuate the seal. The spring-loaded pins 44 include guide sleeves attached to one side of each pressure vessel and a series of guide pins attached to the other side. The guide pins are held together by compression springs. The gate assemblies are free to move within the valve housing and are guided along the tracks 68 by the rollers 62 and 66. The tracks and rollers center the gate assembly within the housing. The actuator rod 54, which is sealed by a bellows 55 to the end 22 of the valve housing, provides motion to cause the gate assembly to move between a first position adjacent to the orifices and a second position displaced from the orifices.

When the gate assembly is positioned adjacent to the orifices, the pressure vessel is inflacted through the tubes 86 to force the gates outwardly against the compressive effects of the guide pins 44 and into sealing relationship with the corresponding seats. When the pressure is relieved from the interior of the pressure vessel, the guide pins 44 draw the gates together and away from the seats.

A specially designed pneumatic cylinder 50 is used to operate the valve, and it incorporates a unique valving system, as described above, with a sliding seal between the piston and piston rod. Actuation of the valve is accomplished, as described above, when pressurized fluid is introduced into the pneumatic cylinder to move its piston to the extreme left, and then allowing the air pressure to build up to a value, for example, of 200 psi to move the piston and to compress the spring 94 of the second embodiment, thus uncovering the air passage through the actuator rod to inflate the pressure vessel. Opening the valve requires a reverse process with the sequence of deflating the pressure vessel and allowing the guide pins 44 to bring the gates back to their central position away from the gates, before introducing air pressure into the orifice 58 in the pneumatic air cylinder to retract the gate assembly and uncover the orifices.

It will be appreciated that although particular embodiments of the invention have been shown and described, modifications may be made. The following claims are intended to cover all the embodiments which come within the true spirit and scope of the invention.

What is claimed is:

1. A gate valve for use in conjunction with vacuum equipment, and the like, comprising: a housing having a pair of opposite walls with respective fluid inlet and outlet openings therein providing a conduit through the valve when the valve is open; a pair of valve seats mounted to surround respective ones of said openings; a gate assembly including a pair of gates positioned adjacent to one another and movable away from one another to seat against said valve seats; a pressure chamber means formed between the gates, an actuator including a cylinder mounted on said housing, a piston mounted in said cylinder and movable therein, and an actuator rod coupled to said piston and coupled to said gate assembly for reciprocally moving said gate assembly in a direction parallel to said opposite wall of said housing between a first position adjacent to said openings and a second position displaced from said openings as said piston is moved in said cylinder, and means for introducing pressurized fluid into said cylinder to move said piston therein; and valve means coupled to said piston for introducing a pressurized fluid into said pressure chamber means when said piston reaches a predetermined position in said cylinder and when said gate assembly is in said first position to cause said gates to move away from one another and to engage and seal with respective ones of said seats.

2. The gate valve defined in claim 1, and which includes a bellows secured to said gates to define therewith an hermetically sealed pressure vessel for receiving said pressurized fluid.

3. The gate valve defined in claim 1, in which said actuator rod has a longitudinal passage extending therethrough, and in which said fluid introducing means includes a valve mounted on said piston for introducing pressurized fluid from said pneumatic cylinder through said valve and through said longitudinal passage into said gate assembly when the pressurized fluid in said pneumatic cylinder moves said piston to said predetermined position and said gate assembly to said first position.

4. The gate valve defined in claim 1, in which said housing is evacuated to reduce the pressure differential across the junctions between said gates and said seats when said gate assembly is in said first position, and when said gates are caused to engage and seal with respective ones of said seats.

5. The gate valve defined in claim 1, in which said gates have grooves therein adjacent the edges thereof to release said edges and to cause said edges to deflect when said gates are caused to engage said seats so as to cause said gates resiliently to engage said seats.

6. The gate valve defined in claim 1, in which said gates and seats are formed of relatively hard metal, and which includes a layer of relatively soft metal interposed between each of said gates and said seats to form a seal therebetween when the gates are caused to engage said seats.

7. The gate valve defined in claim 6, in which said layer is formed of copper.

8. The gate valve defined in claim 6, in which said layer is formed of gold.

9. The gate valve defined in claim 6, in which said layer is formed of silver.

* * * * *